…

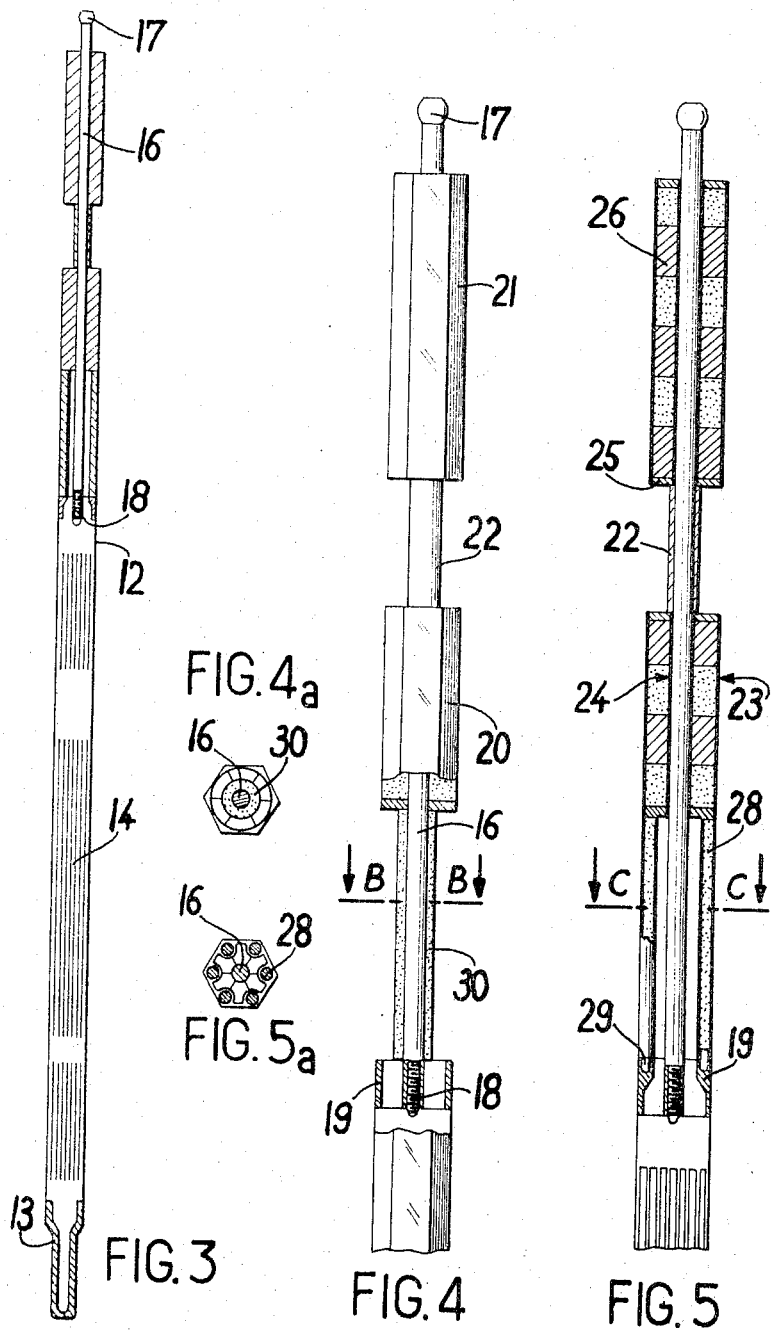

United States Patent Office 3,366,547
Patented Jan. 30, 1968

3,366,547
FAST NUCLEAR REACTOR
André Gumuchian, Paris, Marcel Migadel, Pertuis, and Michel Sauvage, Aix-en-Provence, France, assignors to Commissariat à l'Energie Atomique, Paris, France
Filed July 18, 1966, Ser. No. 566,143
Claims priority, application France, July 22, 1965, 25,542
2 Claims. (Cl. 176—40)

ABSTRACT OF THE DISCLOSURE

A nuclear reactor of the fast neutron type is cooled by circulation of a liquid metal in a sealed vessel having an intake conduit and a lateral discharge conduit for the liquid metal. A plurality of nuclear fuel elements are mounted vertically in the vessel. Each fuel element has a lower tubular case containing the fuel material which case is vertically disposed in the bottom part of the vessel beneath the discharge conduit. Each fuel element has an upper neutron-absorbent portion of the same section as the lower case and the several upper portions of the several fuel elements form an absorbent mass providing a continuous screen preventing neutron leakage through the top of the reactor. A header for the liquid coolant is formed between the lower cases and the upper portions of the fuel elements so that the coolant circulating from bottom to top collects in the header for discharge through the discharge conduit. The upper portion of each fuel element may comprise two spaced masses and the spaces between the masses of the several fuel elements form a throttle or second header for an auxiliary flow of colder liquid coolant from auxiliary ducts through the vessel.

---

This invention relates to nuclear reactors of the fast neutron type and which are cooled by a flow of liquid metal. Such reactors comprise a sealed vessel containing the fuel elements and the liquid metal flows between these fuel elements and an exchange circuit connected to the vessel by intake and discharge conduits.

The liquid metal discharge conduits form a leakage path for the neutrons and this may result in activation of the secondary circuit to which the liquid metal from the primary circuit yields its heat.

To obviate the discharge of the secondary circuit by diffused neutrons through the primary circuit, bends are generally provided in the liquid metal discharge conduits to the exterior of the vessel. This solution becomes practically impossible for high-power reactors because the bends would then result in very large complex circuits and entail unacceptable pressure losses. It has been proposed to replace them by neutron traps disposed in the discharge conduits but these traps have the same disadvantages even if to a lesser degree.

The invention avoids these disadvantages by providing a fuel system for a nuclear reactor of the fast neutron type cooled by circulation of a liquid metal in a sealed vessel provided with at least one intake conduit and a lateral discharge conduit for the liquid metal, said system comprising a lower tubular case containing a fuel material, said case being disposed vertically in the bottom part of said vessel beneath the level of the said discharge conduit, and an upper part of neutron-absorbent material, comprising an absorbent mass of the same section as the lower case and which, when the systems are in position, forms a continuous screen to prevent neutron leakage to the top of the reactor and co-operates with the said case to form a liquid metal header at the said discharge conduit, the said absorbent masses being disposed above elements of reduced section which absorb the neutrons in the said header at the level of the said discharge conduit while allowing the liquid metal to pass. The mass of absorbent material opposes any neutron leakage to the top of the reactor and provides a certain biological protection while at the same time its weight prevents any jumping of the fuel systems as a result of the upward flow of the liquid metal.

Also, during reactor shut-down, the free level of the liquid metal can be brought beneath the top of the absorbent mass and thus greatly reduce the evaporation surface. Also, the central part of the mass may have a throttle for an auxiliary flow of colder liquid during shut-down, again in order to reduce evaporation of the liquid metal.

Figure 1:
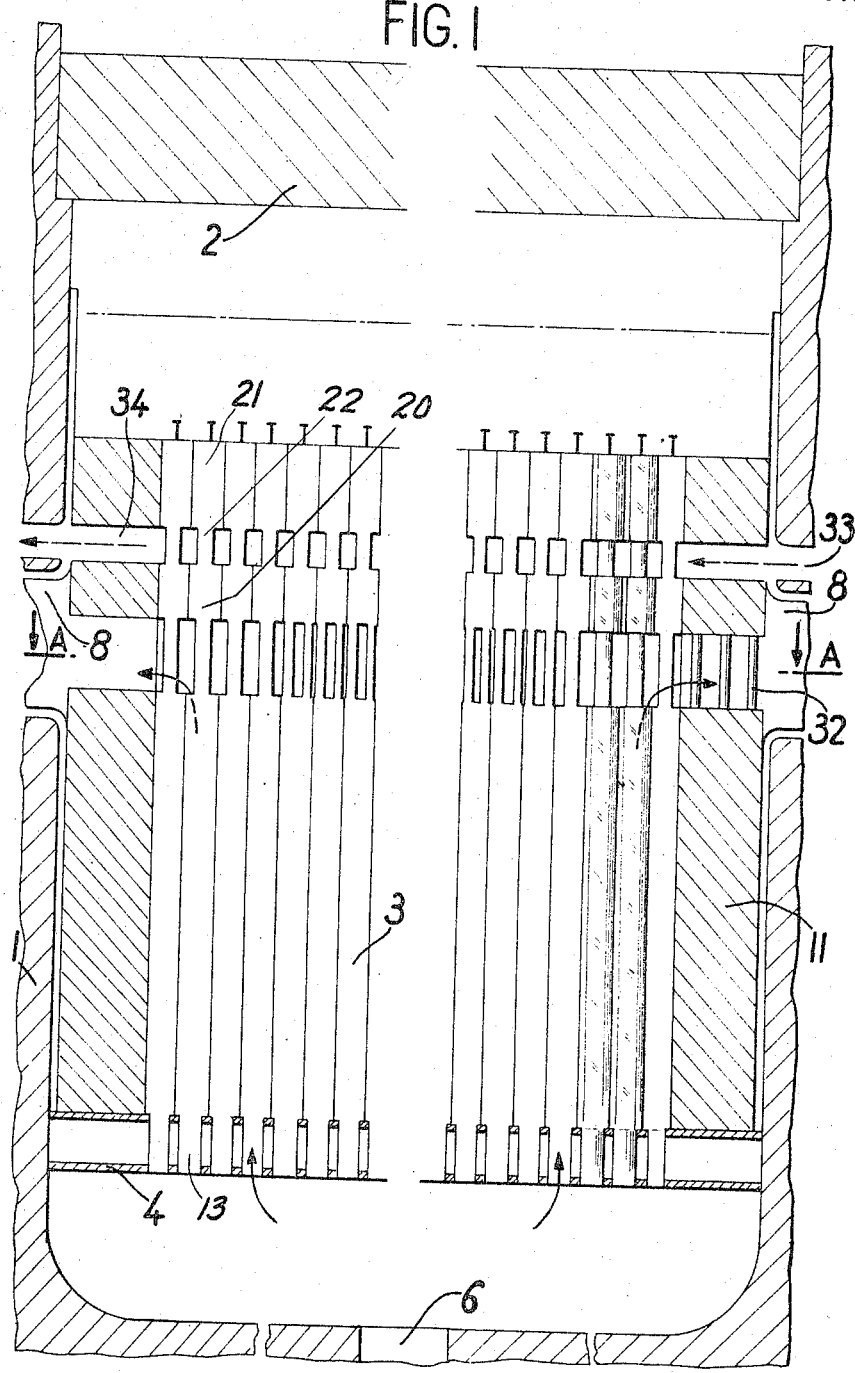
Figure 2:
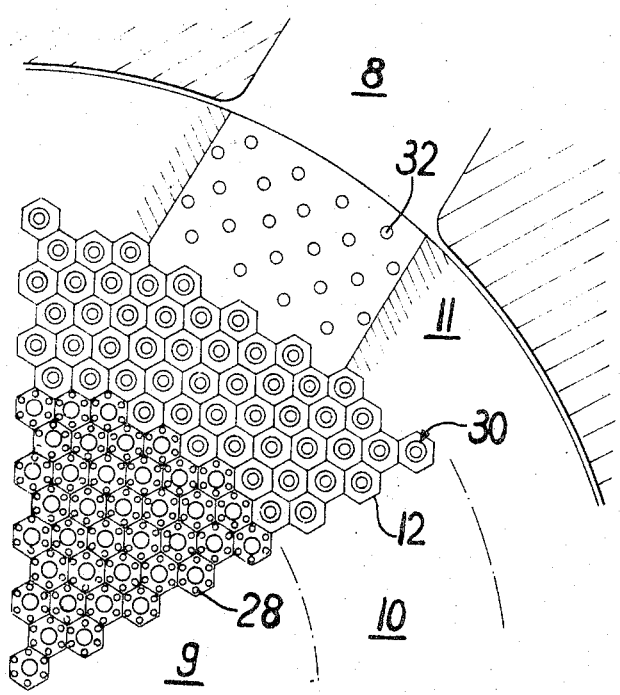

A preferred embodiment of the fuel system according to the invention will now be described by way of example with reference to the accompanying drawings in which:

FIGURE 1 is a vertical section of the reactor showing the two right fuel systems shaded for hexagonal shape, FIGURE 2 is a cross-section on the line A—A in FIGURE 1, FIGURE 3 illustrates a fuel system provided with its absorbent material head, FIGURE 4 shows the head of a fertile system (FIG. 4a is a section on B—B), and FIGURE 5 illustrates the head of a fissile system (FIG. 5a is a section on C—C).

The reactor illustrated in FIG. 1 consists of a vessel 1 closed by a detachable plug 2. This vessel contains the fuel systems 3, which form the reactor core and which are fixed in a double plate 4 and are immersed in liquid sodium. Pumps (not shown) provide a flow of liquid sodium through the fuel systems in the direction of the solid arrows in FIG. 1.

The sodium is admitted at the bottom part of the vessel beneath the plate 4 via an intake conduit 6. It flows up within the cases of the fuel systems and thus cools them. It is discharged to a heat exchanger (not shown) via lateral conduits 8.

Since the reactor is of the fast breeder type, the core comprises a fissile portion 9 surrounded by a blanket of fertile material 10 (FIG. 2). FIG. 2 also shows the division of the core in the transverse direction. The radial blanket 10 is surrounded by a neutron protection 11.

As shown in FIG. 3, each fuel system consists of a hexagonal case 12 terminating in a foot portion 13 allowing passage of the liquid sodium mounted in plate 4. This case 12 contains three tiers of fuel and fertile needles 14. If the fissile system has to occupy the central part of the core, the central tier contains fissile needles and the end tiers contain fertile needles to form top and bottom axial coverings for the core. If the system is intended to form the radial covering, the three tiers consist of fertile fuel needles; a single tier could also be provided to occupy the entire height of the system.

The head of the fuel system at the top of the case 12 comprises a long stainless-steel rod 16, the top end of which is provided with a gripping head 17 for handling the system. The bottom end has a screwthreaded portion 18 screwed into the central screwthread of a grid 19 secured to the top end of the hexagonal case 12 and having the liquid metal from this case flowing through it.

Both for the fertile system shown in FIG. 4 and the fissile system shown in FIG. 5, two sealed chambers 20 and 21 are disposed around the rod 16 and are secured rigidly thereto. The two chambers 20 and 21 contain absorbent materials and are separated by a spacer tube 22 surrounding the rod 16. Each is bounded by an outer tube 23 of hexagonal section identical to that of the case 12 and also, around the rod 16, by a circular tube 24; the tubes 23 and 24 are connected by welded ends 25.

Pins or keys (not shown) prevent any rotation of the chambers 20 and 21 and hold them in the same orientation as the case 12.

The sealed chambers 20 and 21 are filled with neutron absorbent materials 26. The latter may, for example, be boron-containing graphite, boron carbide or zirconium hydride.

Between the case 12 and the bottom chamber 20 are disposed absorbent elements according to the invention. In the case of fertile systems (FIG. 4), a single absorbent element is provided, which consists of a tubular column 30 disposed around the rod 16. In the case of fissile systems (FIG. 5) the absorbent elements consist of 6 tubes 28 disposed at the tops of the hexagon and containing a neutron-absorbent material. These tubes are closed by two welded plugs and the bottom plug 29 of each tube 28 is screwed into a screwthread of the grid 19.

When the systems are in position in the reactor vessel, the various absorbent elements 28 and 30 are situated at the level of the liquid metal discharge conduits 8. They thus form a neutron trap which limits neutron radiation leakage via the conduits 8 while allowing the liquid metal to pass. Since the absorbent elements 28, 30 are in different staggered positions for the fertile and the fissile systems, no radiation is in direct line with the discharge conduits 8.

To improve neutron absorption still further, the trap formed in this way is preferably extended through the neutron protection 11 as shown in FIG. 2 by absorbent columns 32. The latter may be borne by elements of the same form as the fuel systems which are readily introduced and form the neutron protection 11 at the conduits 8.

At the level of the spaced tubes 22 the vessel 1 is provided with auxiliary inlet duct 33 and auxiliary outlet duct 34 for a liquid coolant circulated in the space between the chambers 20 and 21 in the direction of the broken arrows in FIG. 1.

Apart from acting as a neutron trap, the heads of the fuel systems as described hereinbefore perform the following tasks:

(a) They act as baffles by calming the spurting of liquid sodium leaving the cases 12.

(b) They limit the activation of the bottom surface of the plug 2 of the vessel, thus facilitating removal of the latter on reactor shut-down.

(c) They reduce the thickness required for the plug 2 for biological protection and thus allow the use of a lighter plug and hence one which is easier to move.

(d) They reduce any jumping of the systems as a result of the pressure loss of the liquid sodium flowing upwards and eliminate the need for claws on the feet for fixing the systems to the plate.

Other advantages involve the charge and discharge operations for the fuel systems. The level of liquid sodium in the vessel is normally above the gripper heads 17 and is thus brought to the height of the absorbent material chambers 21 thus greatly reducing the evaporation surface which is limited to the clearance between the various chambers 21. Also, the surface temperature of liquid sodium is limited by a flow of cold sodium between the tubes 33 and 34 at the level of the throttles formed by the spacer tubes 22. Thus the systems can be charged or discharged from a cell fitted to the vessel after withdrawal of the plug 2. Since there is very little condensation of active sodium on the cell walls, the conventional limitations arising out of decontamination are reduced accordingly.

We claim:

1. A nuclear reactor of the fast neutron type cooled by circulation of a liquid metal in a sealed vessel provided with at least one intake conduit at the bottom thereof and a lateral discharge conduit for the liquid metal spaced above said intake conduit, a plurality of fuel elements in said vessel each of said elements comprising a lower tubular case containing fuel material disposed vertically in the bottom part of the vessel below said discharge conduit and comprising an upper part of neutron-absorbent material secured to and spaced from and having the same section as said lower case, said upper parts of said fuel elements forming a continuous screen preventing neutron leakage to the top of the reactor and forming with said cases a liquid metal header at said discharge conduit, said upper parts being spaced from said cases by elements of reduced section which absorb neutrons in said header and allow the liquid metal to pass.

2. A nuclear reactor as described in claim 1, each of said upper parts comprising vertically spaced connected absorbent masses and an auxiliary flow of liquid metal coolant between said masses.

References Cited

UNITED STATES PATENTS

| | | | |
|---|---|---|---|
| 2,975,117 | 3/1961 | Zinn | 176—40 X |
| 3,215,606 | 11/1965 | Silvester | 176—40 |
| 3,249,507 | 5/1966 | Gondoin et al. | 176—59 |
| 3,271,260 | 9/1966 | Noderer | 176—40 X |

FOREIGN PATENTS

| | | |
|---|---|---|
| 1,352,950 | 1/1964 | France. |
| 850,014 | 9/1960 | Great Britain. |
| 912,943 | 12/1962 | Great Britain. |
| 985,464 | 3/1965 | Great Britain. |

REUBEN EPSTEIN, *Primary Examiner.*